June 26, 1956   G. S. SCHAIRER   2,752,111
AIR INTAKE SYSTEM FOR AIRCRAFT POWER PLANTS
Filed March 26, 1952
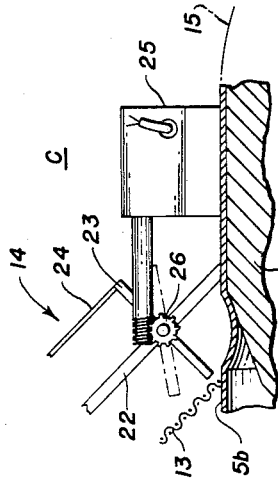
Fig. 3
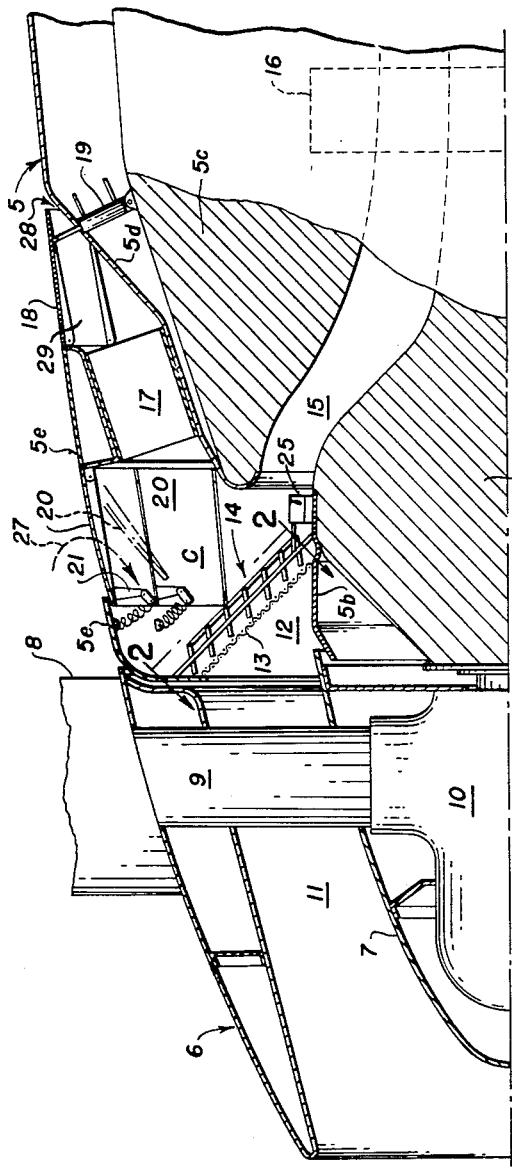
Fig. 1
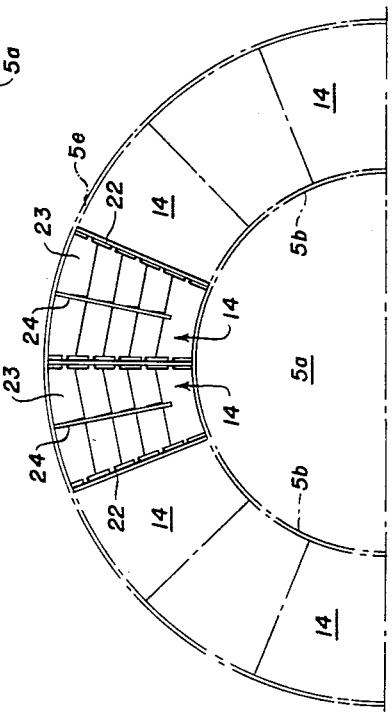
Fig. 2
George S. Schairer
*INVENTOR.*
BY 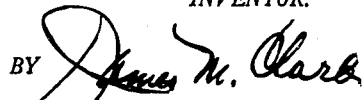
HIS PATENT ATTORNEY.

United States Patent Office 2,752,111
Patented June 26, 1956

2,752,111

AIR INTAKE SYSTEM FOR AIRCRAFT POWER PLANTS

George S. Schairer, Seattle, Wash., assignor to Boeing Airplane Company, a corporation of Delaware Application March 26, 1952, Serial No. 278,673

12 Claims. (Cl. 244—57)

The present invention relates to aircraft power plants and more particularly to improved air intake and cooling arrangements for aircraft engines and their accessories.

It is a principal object of the present invention to provide an improved air intake system for aircraft power plants which provides for an adequate supply of combustion air under a number of different operating conditions of the aircraft. It is a further object to provide an improved air intake arrangement which automatically provides a secondary flow of cooling air when the inlet screen for the primary air supply may become iced up or otherwise clogged. It is a further object to provide adequate cooling for an accessory, such as an oil cooler, disposed adjacent the air intake of the power plant in such manner that under emergency icing conditions the opening of the flow of secondary cooling air is automatically initiated and also provides for the cooling of the oil cooler, or other accessory by flow in the reverse direction. It is a still further object to provide means for accurately controlling the primary airflow during take-off and normal flight, and for restricting the primary airflow for ground operation or take-off when it is desired to initiate the reverse flow for increased cooling of the oil cooler. Still further objects reside in the novel interrelationship of the air intake ducts, the shutter and flap valves controlling the same, and the unique arrangement of the fixed nacelle and the spinner cowl as well as the components which they enclose and fair.

Other objects and advantages of the present invention will become apparent to those skilled in the art after reading the following description taken in conjunction with the accompanying drawings, forming a part hereof, in which:

Fig. 1 is a transverse sectional view of an air intake arrangement for an aircraft power plant embodying the present invention;

Fig. 2 is a sectional view looking forward as taken along the lines 2—2 of Fig. 1; and Fig. 3 is a detailed view of the shutter actuating motor shown in Fig. 1.

The numeral 5 represents the forward portion of a fixed cowl or nacelle which may serve to fair or enclose in its aft portion an otherwise conventional combustion engine or a gas turbine installation (which is not shown in the drawings). The fixed nacelle 5 is provided at its forward or nose portion with a rotatable spinner cowl 6 disposed forward of the fixed nacelle portion 5e and in a substantially continuous streamline relationship therewith. The rotatable spinner 6 may preferably be the N. A. C. A. type E cowl having a central spinner portion 7 defining an annular ram air intake or entrance 11. The power plant drives a forwardly disposed tractor propeller comprising a plurality of propeller blades 8 having shank portions 9 radiating from the central hub 10 from which the spinner cowl 6 is supported for rotation with the power plant and its attached propeller.

The forward portion of the fixed cowl 5 and 5e is provided with a primary ram annular air intake passage 12 across which is disposed a plurality of screen units 13 for the prevention of stones, ice and other foreign particles passing into the air intake system. Directly behind the air intake screen 13 there is provided a plurality of controllable shutter units 14 which may be actuated by individual electric motors 25. The air intake entrance or mouth 11 in the spinner cowl 6 and the air inlet 12 at the forward portion of the fixed cowl 5 cooperate to form the rammed air intake or primary air supply for the power plant. The fixed nacelle 5 is provided with an internal central or axial structure generally indicated at 5a and rearwardly and outwardly spaced therefrom is a further nacelle structure 5c. The opposed faces of these structures 5a and 5c are contoured to form the air supply throat or duct 15 leading rearwardly and toward the central axis of the cowl to the compressor or supercharger indicated at 16 aft of which the power plant is located. The central forward portion 5a is provided with the liner or wall 5b contiguous to the aft portion of the rotatable inner spinner 7 and the outer annular portion 5c is provided with a wall 5d outwardly spaced therefrom and inwardly spaced from the fixed exterior surface 52 of the cowl 5 to provide an air passage or longitudinal duct 29 within which may be disposed the oil cooler 17 or other engine accessory. At the forward portion of the cowl 5 there is also defined by the walls 5b, 5d and the cowl shell 5e a plenum chamber C aft of and above the air inlet 12.

On the trailing side of the oil cooler 17 there is provided a flap valve 18 hinged adjacent its forward edge and having an actuator 19 pivotally attached to its trailing portion, for the control of the opening 28 between the main and forward cowl portions 5 and 5e. The actuating motor 19 is preferably of the piston-cylinder type such as disclosed in U. S. Patent No. 2,365,951 which issued December 26, 1944, and is such that under certain operating conditions it may serve as a resilient dash-pot or damper for resiliently maintaining the flap valve 18 in the predetermined position shown in Fig. 1. Forward of the oil cooler 17 there are provided a plurality of spring-biased flap valves 20 pivotally supported adjacent their aft portions upon the fixed cowl 5 adjacent the oil cooler 17, defining the static pressure inlet 27. Suitable spring-biased brackets 21 interconnect the leading edge of each of the flap valve units 20 with the fixed forward portion of the cowl 5. The spring biasing connections 21 are tensioned such that the flap valve units 20 are normally in the closed position shown in Fig. 1 when the primary airflow is passing through the rammed or dynamic air intake 11 and the inlet 12, but the pressure conditions within the chamber C are such that when the screen 13 is iced up or blocked off, or the controllable shutter 14 is closed, the external static pressure upon the exterior of the flap valves 20 will cause the same to overcome the spring tension and open inwardly and assume the dotted position shown in Fig. 1. The outer surface of the flap valves 20 is located in a region of positive static pressure, as distinguished from the rammed air dynamic pressure of the flow entering the intake 11. Accordingly when the pressure within the chamber C and the throat 15 behind the screen 13, drop due to obstruction of the screen, or closing of the shutters 14, the internal pressure is no longer of sufficient magnitude to assist the spring-biasing fittings 21 and the static pressure accordingly deflects the flap valves 20 inwardly to the dotted position shown and causes air to be drawn inwardly over the leading edge of the opened flap valves 20 and through the static pressure inlet 27. This flow also induces a flow inwardly within the cowl from the trailing flap valves 18 through the rear opening 28 causing a reverse flow condition to prevail through the duct 29 across the oil cooler 17. Under either normal or reverse flow through the flap valves 18 it may be regulated manually or automatically by the actuator 19.

Referring now to Figs. 2 and 3, and more particularly to the latter, the controllable shutter units 14 are provided with a fixed supporting frame 22 on which the vanes or shutters 23 are pivotally mounted, being interconnected at their trailing extremities by the actuating or interconnecting bar or tie 24. This tie 24 insures that each of the shutters will be moved concurrently, after the fashion of a Venetian blind, and the lower shutter 23 may preferably be provided with a worm wheel drive unit 26 on its pivotal mounting for rotation in either direction by the electric motor 25, fixably mounted upon the central cowl structure 5a.

The improved air intake system operates as follows: Under normal warm-up, ground taxiing or take-off conditions the spring-loaded flap valves 20 across the static pressure intake 27 will remain closed and the flow induced by the suction of the compressor or supercharger 16 will cause the primary air to flow inwardly through the spinner intake 11, the cowl mouth 12 and into the chamber C and the throat 15, the primary flow through the air inlet or being controllable manually or automatically by means of the controllable shutter units 14. A portion of the rammed air supply flows from the chamber C rearwardly past the oil cooler 17 and out through the valve 18 and the opening 28. Under certain ground conditions and during take-off when the cooling of the oil cooler 17 is not adequate before flight speed is reached, the shutter units 14 may be closed to thereby draw the main combustion air supply through the static pressure intake 27 and the flaps 20 and to induce reverse or forward flow through the oil cooler flap valves 18 and the opening 28, and forwardly past the oil cooler 17. Accordingly, the closing of the shutter units 14 can be used at take-off to increase the flow of air through the oil cooler and this reverse flow is greater than the normal flow since very little rammed pressure is available at take-off. This change-over to the alternate or secondary air supply becomes entirely automatic during flight when icing conditions prevail and the screen 13 collects sufficient ice to close off the cowl entrance opening 12. This has the same effect as closing the shutter units 14 thereby reducing the pressure in the chamber C internally of the cowl and causing opening of the static pressure intake flaps 20, and the opening 27, and the oil cooler flap 18, and its opening 28, for reversed air cooling of the oil cooler, or other heat exchange accessory.

Other forms and modifications of the disclosed arrangement which may occur to those skilled in the art are intended to fall within the scope and spirit of the present invention as defined by the appended claims.

I claim:

1. In aircraft, a power plant installation including a relatively fixed cowl, a spinner cowl rotatably mounted in a streamlined continuation of said fixed cowl, a rammed air inlet formed by said spinner cowl and an adjacent portion of said relatively fixed cowl, a static pressure inlet and an adjacent air chamber formed within said fixed cowl, a screen disposed across said rammed airflow inlet, a resiliently biased closure for said static pressure inlet, means for conducting air supplied from both said inlets to said chamber within said fixed cowl, the normal rammed airflow into said chamber producing sufficient pressure to maintain said resiliently biased static pressure inlet closure in its closed position, means for conveying air from said chamber to a power plant within said fixed cowl whereby impairment of said screen retarding the flow through said rammed air inlet reduces the pressure within said chamber for opening said closure for providing alternate air supply to the power plant, a heat exchange device disposed in a duct normally receiving rammed air from said chamber and exhausting through an opening in said fixed cowl, the pressure relationship of said chamber, said static air inlet and said heat exchange opening being such that as said alternate air is supplied to the power plant air is also admitted into said opening for flow past said heat exchange device in the reverse direction, and means for controlling the airflow through said heat exchange device in both the normal and reverse flow directions.

2. In aircraft, a fixed nacelle enclosing a power plant, a spinner cowl rotatably mounted adjacent said fixed nacelle, a rammed air intake formed by said spinner cowl, means for providing communication between said rammed air intake and an internal chamber formed in said fixed nacelle, said fixed nacelle provided with a static pressure opening adjacent said internal chamber, a resiliently biased closure for said static pressure opening, a heat exchange device within said fixed nacelle disposed aft of said static pressure opening, a further opening through said fixed nacelle aft of said heat exchange device and controllable valve means disposed in the flow from said rammed air intake for selectively reversing the normal flow through said heat exchange device by cutting off the rammed air pressure to said internal chamber and initiating opening of the said resiliently biased closure for admission of air through said static pressure opening and said further opening.

3. In an aircraft air intake system, a fixed nacelle enclosing a power plant, a spinner cowl rotatably mounted forward of said fixed nacelle, a rammed air intake formed within said spinner cowl and within an adjacent portion of said fixed nacelle, an internal chamber formed within said nacelle, means for providing communication between said rammed air intake and said internal chamber in said fixed nacelle and between said chamber and the power plant, said fixed nacelle provided with a static pressure opening adjacent said internal chamber, a resiliently biased closure for said static pressure opening, an oil cooler within a longitudinal duct in said fixed nacelle aft of said static pressure opening, a further opening through said fixed nacelle aft of said oil cooler at the aft terminal of said duct, the rammed air normally flowing to said chamber and said power plant and in an aft direction past said oil cooler, controllable valve means disposed in the flow from said rammed air intake for selectively closing said rammed air intake, for opening said static pressure opening and for changing the normal flow past said oil cooler to a reversed flow from the aft terminal of said duct to said chamber, and means for controlling the airflow past said oil cooler in both said normal and reverse flow directions.

4. In a vehicle air intake system a rammed air intake duct, a static pressure air intake duct, an air chamber joining said intake ducts, outlets from said chamber leading to an air consuming unit and an air cooled unit, said air consuming unit including an air compressor arranged to draw air through one of said outlets from said chamber, a screen disposed across said rammed air flow duct, a resiliently biased closure for said static air intake whereby impairment of said screen retarding the flow through said rammed air inlet and the effect of said air compressor reduces the pressure within said chamber for opening said closure for providing alternate air supply from said static pressure air intake duct to said air consuming unit and for reversing the direction of flow through said air cooled unit, and valve means for controlling the flow through said air cooled unit in both the normal and reverse flow directions.

5. In a vehicle air intake system, a rammed air intake duct, a static pressure air intake duct, an air chamber joining said intake ducts, a resiliently biased closure for said static pressure opening, outlets from said chamber to an air consuming unit and an air cooled unit, said air consuming unit including an air compressor arranged to draw air through one of said outlets from said chamber, a further outlet leading from the air cooled unit to the air surrounding the vehicle, controllable valve means disposed in the flow from said rammed air intake in cooperation with said air compressor for selectively reversing the normal flow through said air cooled unit, and further valve means for controlling the flow through said air cooled unit in both the normal and reverse flow directions.

6. In a vehicle air intake system, a rammed air intake duct, a static pressure air intake duct, a resiliently biased closure for said static pressure intake duct, an air chamber joining said intake ducts, a heat exchanger located in a duct leading from said air chamber to the atmosphere surrounding said vehicle, an outlet duct from said air chamber leading to an air compressor and an air consuming unit, controllable valve means disposed in the flow from said rammed air intake in cooperation with said air compressor for selectively closing said rammed air intake, opening said static pressure opening and changing the normal flow past said heat exchanger to a reversed flow from the surrounding atmosphere to said chamber, and further valve means for controlling the flow past said heat exchanger in both the normal and reverse flow directions.

7. In a vehicle air intake system, a rammed air intake duct, a static pressure air intake duct, a resiliently biased closure for said static pressure intake duct, an air chamber joining said intake ducts, a pipe leading from said air chamber to the atmosphere surrounding said vehicle, a heat exchanger located in said pipe, an outlet duct from said air chamber leading to an air compressor and an air consuming unit, a controllable valve means disposed in the flow from said rammed air intake for selectively closing said rammed air intake, whereby when said controllable valve is closed the reduced air pressure in said chamber due to the effect of said air compressor will open said closure and reverse the normal flow through said heat exchanger to draw air through said pipe into said chamber, and a variable position controllable valve located in the flow between said heat exchanger and the atmosphere whereby the rate of flow through said heat exchanger in both the normal and reverse flow directions is controlled.

8. In a vehicle air intake system, a rammed air intake duct, a static pressure air intake duct, a resiliently biased closure for said static pressure intake duct, an air chamber joining said intake ducts, a pipe leading from said air chamber to the atmosphere surrounding said vehicle, a heat exchanger located in said pipe, an outlet duct from said air chamber leading to an air compressor and an air consuming unit, a screen disposed across said rammed air flow duct, whereby impairment of flow through said rammed air intake duct in cooperation with said air compressor reduces the pressure within said chamber to open said closure and reverse the normal flow through said heat exchanger to draw air through said pipe into said chamber, and a variable position controllable valve located in the flow between said heat exchanger and the atmosphere whereby the rate of flow through said heat exchanger in both the normal and reverse flow directions is controlled.

9. An air intake system for an aircraft power plant comprising a plurality of separate inlets for combustion air to the power plant, a first of said inlets arranged for rammed air pressure for the normal supply of the power plant, a first static pressure inlet arranged for alternate air supply to the power plant, a chamber separately communicating with each of said inlets, an intake conduit connecting said chamber with an induction component of the power plant, said chamber normally having positive pressure therein due to said rammed air pressure, a second static pressure opening normally serving as an outlet from said chamber and serving as an air inlet under reverse flow conditions upon reduction in pressure in said chamber resulting from interruption of said rammed air flow and the effect of said induction component, a heat exchange device disposed between the second said static pressure opening and said chamber, controllable valve means disposed within said rammed air inlet, normally closed self-opening valve means disposed within the first said static pressure inlet arranged to open upon reduction of pressure within said chamber and the effect of said induction component, the direction of airflow across said heat exchange device determined by said pressure conditions within said chamber and a further controllable valve disposed within said second static pressure opening arranged to control the flow across said heat exchange device regardless of the direction of said flow.

10. An air intake installation for an aircraft power plant comprising a fixed nacelle, a rammed air inlet formed within said nacelle, a static pressure air inlet in said nacelle, a normally closed spring-biased closure means forming a portion of the exterior surface of said nacelle arranged for controlling said static pressure air inlet, first duct means for conveying air from said rammed air inlet to an interior chamber within said nacelle, further duct means for conveying air from said static pressure inlet to said chamber, means including an air displacement device for conveying air from said interior chamber to the power plant, a screen having an adjustable shutter disposed within said rammed air inlet for controlling the air pressure within said chamber, a duct extending from said interior chamber to an opening in the exterior surface of said nacelle, a heat exchange device disposed within said duct, and a controllable valve disposed at said duct opening, the spring biasing of said closure means for said static pressure air inlet being arranged in such manner that when the normal rammed air flow through said screen is interrupted either by clogging of said screen or closing of said shutter the resulting pressure reduction within said air chamber caused by said air displacement device drawing air from against said closed shutter initiates movement of said closure means for the opening of said static pressure air inlet and the reversal of the direction of the air flow through said duct across said heat exchange device, said valve controlling the flow across said heat exchange device in both said normal and reverse directions.

11. In aircraft, a nacelle enclosing a power plant, air compressing means associated with said power plant, said nacelle having a forwardly opening annular portion forming a rammed air intake, duct means providing communication between said rammed air intake and an internal chamber formed within said nacelle, said nacelle provided with a static pressure opening adjacent said internal chamber, a resiliently biased closure movably mounted upon said nacelle for said static pressure opening, a heat exchange device disposed within said nacelle disposed aft of said static pressure opening, a further opening through said nacelle aft of said heat exchange device, and controllable valve means disposed in the flow from said rammed air intake for selectively reversing the normal flow through said heat exchange device by cutting off the rammed air pressure to said chamber and initiating opening of said resiliently biased closure for admission of air through said static pressure opening and said further aft opening.

12. In aircraft, a nacelle enclosing a power plant, an air compressor associated with said power plant, said nacelle having a forwardly opening annular portion forming duct means providing communication between said rammed air intake and an internal chamber formed within said nacelle, said nacelle provided with a static pressure opening adjacent said internal chamber, a resiliently biased closure movably mounted upon said nacelle for said static pressure opening, a heat exchange device disposed within said nacelle disposed aft of said pressure opening, a further opening through said nacelle aft of said heat exchange device, and screen means disposed in the flow from said rammed air intake, said screen means upon becoming blocked causing reversing of the normal flow through said heat exchange device by cutting off the rammed air pressure to said chamber and initiating opening of said resiliently biased closure for admission of air through said static pressure opening and said further aft opening under the influence of said air compressor.

References Cited in the file of this patent

UNITED STATES PATENTS

| | | |
|---|---|---|
| 1,864,201 | Kegerreis | June 21, 1932 |
| 2,396,317 | Cutts | Mar. 12, 1946 |
| 2,396,598 | Neumann | Mar. 12, 1946 |
| 2,425,508 | Chilton | Aug. 12, 1947 |
| 2,474,068 | Sammons | June 21, 1949 |
| 2,604,278 | Johnson | July 22, 1952 |
| 2,605,851 | Gleason | Aug. 5, 1952 |
| 2,638,287 | Avondoglio | May 12, 1953 |

FOREIGN PATENTS

| | | |
|---|---|---|
| 534,065 | Great Britain | Feb. 26, 1941 |

OTHER REFERENCES

Hawthorne: "Aviation Operations," pp. 24, 25, July 1950, 244-134.